(12) United States Patent
Gao et al.

(10) Patent No.: US 12,542,434 B2
(45) Date of Patent: Feb. 3, 2026

(54) CIRCUIT PROTECTION DEVICE FOR AUTOMATICALLY MONITORING OPERATION FAULTS

(71) Applicant: Zhejiang Shengyu Electrical Co., Ltd., Zhejiang (CN)

(72) Inventors: Tuo Gao, Zhejiang (CN); Xikang Gao, Zhejiang (CN)

(73) Assignee: Zhejiang Shengyu Electrical Co., Ltd., Zhejiang (CN)

( * ) Notice: Subject to any disclaimer, the term of this patent is extended or adjusted under 35 U.S.C. 154(b) by 135 days.

(21) Appl. No.: 18/393,718

(22) Filed: Dec. 22, 2023

(65) Prior Publication Data

US 2024/0213761 A1  Jun. 27, 2024

(30) Foreign Application Priority Data

Dec. 26, 2022  (CN) .......................... 202211677584.7

(51) Int. Cl.
*H02H 3/16*    (2006.01)
*H02H 1/00*    (2006.01)
*H02H 3/04*    (2006.01)
*H02H 3/05*    (2006.01)

(52) U.S. Cl.
CPC .......... *H02H 3/162* (2013.01); *H02H 1/0007* (2013.01); *H02H 3/04* (2013.01); *H02H 3/05* (2013.01)

(58) Field of Classification Search
CPC ........ H02H 3/162; H02H 1/0007; H02H 3/04; H02H 3/05
See application file for complete search history.

(56) References Cited

U.S. PATENT DOCUMENTS 4,152,744 A * 5/1979 Pang ...................... H02H 3/093
                                                        361/94
5,086,366 A * 2/1992 Ishii ......................... H02H 3/04
                                                        361/97

(Continued)

FOREIGN PATENT DOCUMENTS

CN       105896469 B     10/2018

*Primary Examiner* — Thienvu V Tran
*Assistant Examiner* — Muaamar Qahtan Al-Taweel
(74) *Attorney, Agent, or Firm* — JEEN IP LAW, LLC

(57) ABSTRACT

The present disclosure provides a circuit protection device for automatically monitoring operation faults. The grounding fault protection unit includes a grounding fault detection circuit, an AC power channel, and an electromagnetic driving circuit. The self-fault monitoring unit includes a measurement and control circuit and a fault state holding circuit. The measurement and control circuit initiates a self-fault monitoring process at regular time and monitors the fault state signal feedback by the electromagnetic driving circuit to achieve self-fault monitoring. If there is a fault, an emergency interrupt signal is output to trigger an emergent disconnection of the grounding fault protection unit. The fault state holding circuit includes a reset circuit and a fault state triggering circuit. The reset circuit clears the fault state, and the fault state triggering circuit maintains the fault state signal output by the measurement and control circuit to generate effective alarming information.

10 Claims, 3 Drawing Sheets

(56) References Cited

U.S. PATENT DOCUMENTS

| | | | | |
|---|---|---|---|---|
| 5,600,524 | A * | 2/1997 | Neiger | H02H 3/335 361/45 |
| 5,774,319 | A * | 6/1998 | Carter | H02H 1/06 361/100 |
| 9,118,174 | B2 * | 8/2015 | Simonin | H02H 1/0092 |
| 2007/0091520 | A1 * | 4/2007 | Angelides | H02H 3/335 361/42 |

* cited by examiner

CIRCUIT PROTECTION DEVICE FOR AUTOMATICALLY MONITORING OPERATION FAULTS

CROSS-REFERENCE TO RELATED APPLICATIONS

The present application claims the priority of Chinese Invention Application No. 202211677584.7, filed on Dec. 26, 2022, the entire contents of which are hereby incorporated by reference.

TECHNICAL FIELD

The present disclosure relates to the field of circuit protection technology, and more particularly, to a circuit protection device for automatically monitoring operation faults, such as a residual current operated protective device or a ground fault circuit interruption device, wherein the circuit protection device can automatically monitor operation conditions thereof, output alarming signals when operation faults occur, and take emergency power-off measures.

DESCRIPTION OF THE PRIOR ART

Circuit protection devices such as residual current operated protection devices or ground fault circuit interruption devices are used to detect ground fault currents (GFC) in electrical appliances, instruments, devices, equipment, electrical systems and the like powered by grid power supplies and power supply lines. When the GFC exceeds a specified limit, the circuit protection device can automatically cut off a power supply, thereby protecting personal and property safety. In practical applications, a ground fault detection circuit of the residual current operated protection device or the ground fault circuit interruption device often malfunctions partially or completely, resulting in the malfunctioning of the protection function of the ground fault circuit interruption device or missing of alarming information. At this time, the user is not aware of the potential safety hazards.

To solve the above problems, some ground fault circuit interruption devices are designed according to the UL943 standard and equipped with self-fault monitoring functions to regularly diagnose the working condition of the ground fault circuit interruption device. When the ground fault circuit interruption function malfunctions, alarming signals are output or a protection mechanism is disconnected. Some ground fault circuit interruption devices can achieve a forced disconnection when the ground fault protection function malfunctions, however, due to complex circuits and structures or difficulty in manufacturing and high cost, after the forced disconnection is performed, an indicator light of the ground fault circuit interruption device may still flash according to the original cycle, or even may not be turned on, failing to play an effective alarming role, reducing the alarming effect of the circuit protection device, and still posing potential safety hazards.

SUMMARY OF THE DISCLOSURE

One technical problem to be solved in the present disclosure is to provide a fault state holding circuit for the circuit protection device. When a ground fault protection function of the circuit protection device malfunctions, the fault state holding circuit can maintain the fault state signal, such that an indicator light is turned on for a long time to indicate a fault of the circuit protection device. Another technical problem to be solved in the present disclosure is to provide a flashing alarming circuit for the circuit protection device to improve the alarming effect.

In order to solve the above technical problems, the present disclosure provides a circuit protection device for automatically monitoring operation faults, including a ground fault protection unit and a self-fault monitoring unit, the ground fault protection unit including a ground fault detection circuit, an AC power channel, and an electromagnetic driving circuit, the self-fault monitoring unit including an automatic test circuit, a measurement and control circuit, and an alarming circuit; wherein the self-fault monitoring unit further includes:

a fault state holding circuit including a reset circuit and a fault state triggering circuit, wherein the reset circuit receives a self-fault monitoring signal U_TEST output by the measurement and control circuit at regular time and outputs a reset signal U_clr, the fault state triggering circuit receives the reset signal U_clr and an emergency interrupt signal U_EI output by the measurement and control circuit, and when the ground fault protection unit malfunctions, the fault state triggering circuit outputs and holds fault state signal U_err, causing the alarming circuit to remain in an alarming state which indicates a fault of the circuit protection device.

In an embodiment, the reset circuit includes a reset capacitor that captures level inversion information of the self-fault monitoring signal U_TEST for generating the reset signal U_clr.

In an embodiment, the fault state triggering circuit includes a voltage comparator that receives the reset signal U_clr and the emergency interrupt signal U_EI and outputs the fault state signal U_err.

In an embodiment, the fault state signal U_err output by the fault state triggering circuit includes a low-level state and a high-level state; the alarming circuit receives the fault state signal U_err; during a self-fault monitoring process, when the circuit protection device is normal, the alarming circuit stops outputting alarming information; when the ground fault protection unit malfunctions, the alarming circuit remains in the alarming state.

In the circuit protection device for automatically monitoring operation faults provided by the present disclosure, the fault state triggering circuit outputs the fault state signal U_err, which includes a low-level state and a high-level state. The alarming circuit receives the fault state signal U_err. During the self-fault monitoring process, when the circuit protection device is normal, the indicator light of the alarming circuit is turned off; when the ground fault protection unit malfunctions, the indicator light of the alarming circuit flashes to improve the alarming effect. The circuit of the present disclosure is simple, economical, and efficient.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The technical scheme in the embodiment of the present disclosure will be described more directly below in combination with the drawings in the embodiment of the present disclosure. Obviously, the described embodiment is only a part of the embodiment of the invention, not all of the embodiment. Based on the examples in the invention, all other examples obtained by ordinary technicians in the art without creative labor fall within the scope of protection of the invention.

Figure 1:
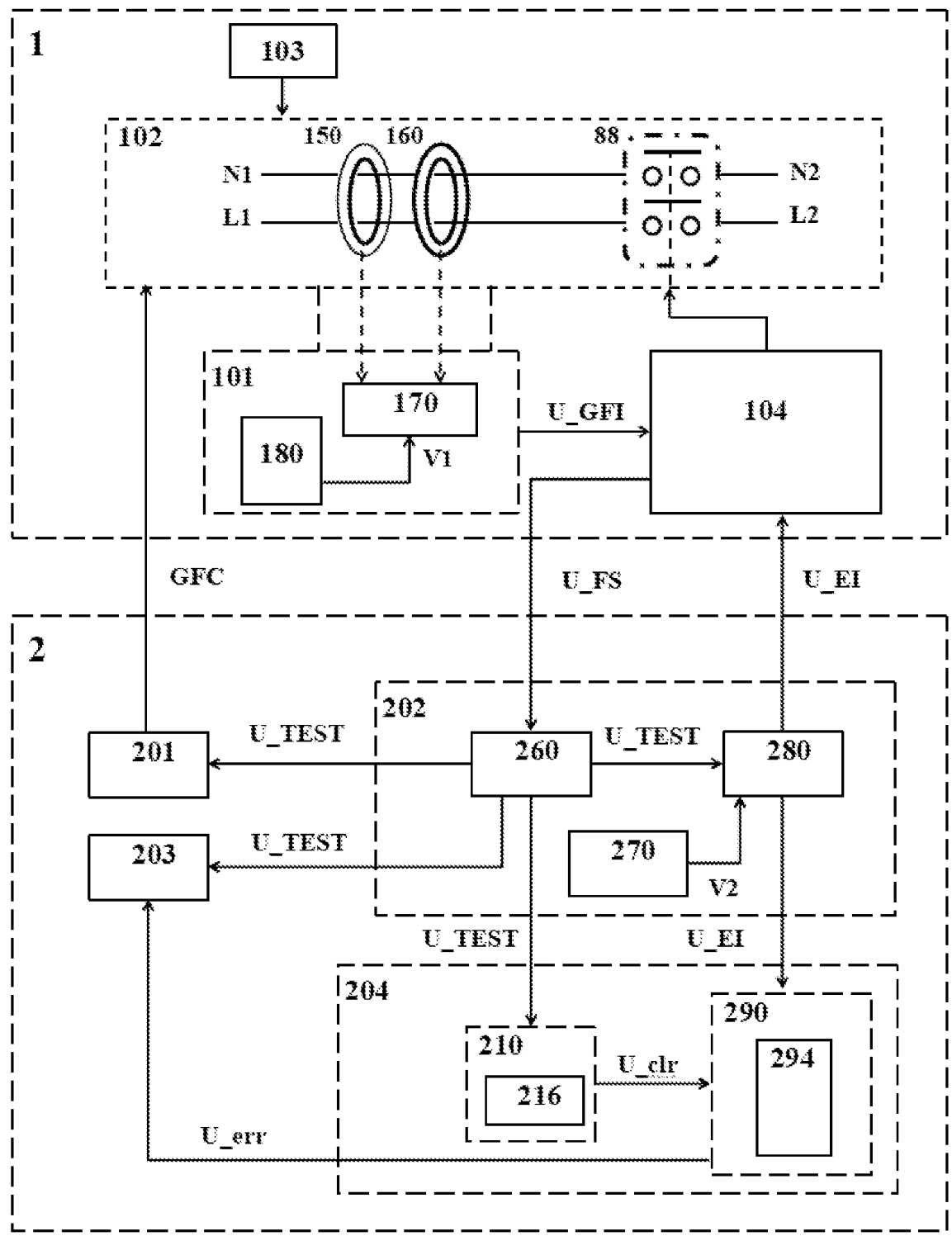
FIG. 1 is a structural framework diagram of a circuit protection device in accordance with an embodiment of the present disclosure.

FIG. 1 is a structural diagram of a circuit protection device for automatically monitoring operation faults in an embodiment of the present disclosure, showing main functional units and control relationships of the circuit protection device. The circuit protection device includes a ground fault protection unit 1 and a self-fault monitoring unit 2. The ground fault protection unit 1 implements a ground fault protection function and outputs a fault state signal U_FS to the self-fault monitoring unit 2; the self-fault monitoring unit 2 outputs a ground fault current GFC to the ground fault protection unit 1, monitors the fault state signal U_FS of the ground fault protection unit 1, and outputs an emergency interrupt signal U_EI to the ground fault protection unit 1 to implement self-fault monitoring and emergency protection functions.

As shown in FIG. 1, the ground fault protection unit 1 includes a ground fault detection circuit 101 and an AC power channel 102, a manual test circuit 103 and an electromagnetic driving circuit 104. The AC power channel 102 includes a magnetic switch 88, AC power input terminals N1 and L1, and load terminals N2 and L2. The magnetic switch 88 is configured to connect or cut off an electrical path between the AC power input terminals and the load terminals.

The ground fault detection circuit 101 includes a ground fault current sensor 150, a neutral line repeated grounding sensor 160, a ground fault detection chip 170, and a first DC power supply 180. The ground fault current sensor 150 and the neutral line repeated grounding sensor 160 sense the ground fault current GFC occurring in the AC power channel 102 and transmit a ground fault signal to the ground fault detection chip 170. The ground fault detection chip 170 is configured to detect the ground fault signal transmitted by the ground fault current sensor 150 and the neutral line repeated grounding sensor 160, and output a ground fault interrupt signal U_GFI. The first DC power supply 180 is configured to provide a DC power V1 to the ground fault detection chip 170, and a negative electrode of the first DC power supply 180 is used as a logic ground GND of the circuit protection device.

The manual test circuit 103 outputs the ground fault current GFC to the AC power channel 102 for testing the ground fault protection function of the ground fault protection unit 1.

The self-fault monitoring unit 2 includes an automatic test circuit 201, a measurement and control circuit 202, and an alarming circuit 203. The measurement and control circuit 202 periodically (e.g., once every minute) outputs a self-fault monitoring signal U_TEST to initiate the self-fault monitoring process, controls the automatic test circuit 201 to output the ground fault current GFC to the ground fault protection unit 1, and monitors the fault state signal U_FS output by the electromagnetic driving circuit 104 in the ground fault protection unit 1 to determine an operating condition of the ground fault protection unit 1. When the ground fault protection unit 1 malfunctions, the measurement and control circuit 202 outputs the emergency interrupt signal U_EI to the electromagnetic driving circuit 104 to trigger the operation of the electromagnetic driving circuit 104, causing a disconnection of the magnetic switch 88, thereby achieving the emergency protection function. At the same time, the self-fault monitoring signal U_TEST is connected to the alarming circuit 203, such that the alarming circuit 203 can output alarming information. It should be noted that the alarming circuit 203 can be a device such as an indicator light or a voice alarm. Hereinafter, the indicator light is used as an example for explanation.

The measurement and control circuit 202 includes an emergency protection circuit 280, a monitoring chip and auxiliary circuit 260, and a second DC power supply 270. The second DC power supply 270 provides a DC power V2 to the self-fault monitoring unit 2. The monitoring chip and auxiliary circuit 260 regularly sends the self-fault monitoring signal U_TEST to initiate the self-fault monitoring process, and terminates the self-fault monitoring process upon receiving the fault state signal U_FS. The emergency protection circuit 280 sets a maximum running time Tmax (such as 40 mS) for the self-fault monitoring process. During the self-fault monitoring process, the emergency protection circuit 280 receives the self-fault monitoring signal U_TEST, monitors a running time Trun of the self-fault monitoring process; when the running time Trun is less than the maximum running time Tmax, the emergency protection circuit 280 determines that the ground fault protection unit 1 is in a normal state; when the running time Trun is greater than the maximum running time Tmax, the emergency protection circuit 280 determines that the ground fault protection unit 1 is in a fault state, and the emergency protection circuit 280 outputs the emergency interrupt signal U_EI to trigger the disconnection of the ground fault protection unit 1, thereby achieving the emergency protection function.

The self-fault monitoring unit 2 further includes a fault state holding circuit 204, which receives the self-fault monitoring signal U_TEST and the emergency interrupt signal U_EI, and outputs a fault state signal U_err to the alarming circuit 203.

The fault state holding circuit 204 includes a reset circuit 210 and a fault state triggering circuit 290. The reset circuit 210 includes a reset capacitor 216, which captures level inversion information of the self-fault monitoring signal U_TEST at the moment the self-fault monitoring process is initiated and outputs a reset signal U_clr.

The fault state triggering circuit 290 includes a voltage comparator 294 that receives the clear signal U_clr and the emergency interrupt signal U_EI and outputs the fault state signal U_err. At the moment that the self-fault monitoring process is initiated, the fault state triggering circuit 290 is cleared by the reset signal U_clr, outputs and maintains the fault state signal U_err, such that the indicator light of the alarming circuit 203 is turned off. When the ground fault protection unit 1 malfunctions, on the one hand, the fault state triggering circuit 290 is set by the emergency interrupt signal U_EI, outputs and maintains the fault state signal U_err, and turns on the indicator light of the alarming circuit 203, indicating a fault of the ground fault protection unit 1.

On the other hand, the fault state triggering circuit 290 is also instantly cleared by the periodic reset signal U_clr, thereby outputting the periodically-changing fault state signal U_err.

From the above, the fault state holding circuit 204 outputs the fault state signal U_err, which includes a low-level state and a high-level state. The alarming circuit 203 receives the fault state signal U_err. During the self-fault monitoring process, when the circuit protection device works normally, the indicator light of the alarming circuit 203 is turned off. When the ground fault protection unit 1 malfunctions, the indicator light of the alarming circuit 203 flashes to improve the alarming effect.

From the above, the emergency interrupt signal U_EI is simultaneously connected to the electromagnetic driving circuit 104 and the fault state triggering circuit 290. When the ground fault protection unit 1 fails, the circuit protection device maintains the alarm output state after realizing the emergency disconnection and cutting off the AC power circuit.

Figure 2:
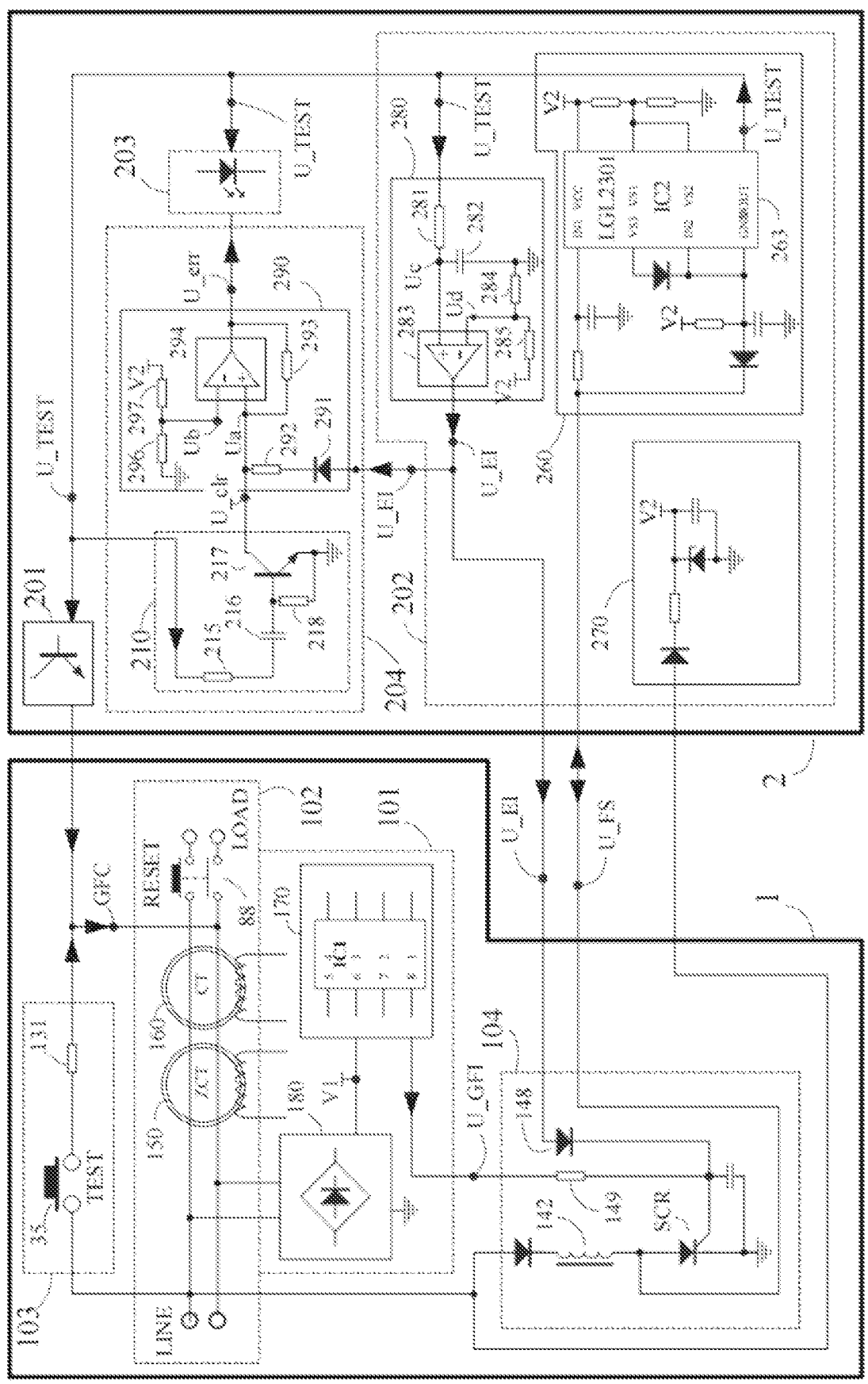
FIG. 2 is a circuit schematic diagram of the circuit protection device in accordance with an embodiment of the present disclosure.

FIG. 2 shows an embodiment of the circuit protection device for automatically monitoring operation faults in the present disclosure, which shows a circuit diagram of each functional unit of the circuit protection device of FIG. 1.

In the AC power channel 102, an AC power is input through the AC power input terminals L1 and N1, passes through the ground fault current sensor 150 and the neutral line repeated grounding sensor 160, and is connected to an input terminal of the magnetic switch 88. An output terminal of the magnetic switch 88 is connected to the load terminals L2 and N2.

In the ground fault detection circuit 101, the ground fault current sensor 150, the neutral line repeated grounding sensor 160, and the ground fault detection chip 170 sense the ground fault current GFC in the AC power channel 102 and output the ground fault interrupt signal U_GFI. When the ground fault current GFC exceeds a trip threshold, the ground fault interrupt signal U_GFI changes from a low level to a high level. When the ground fault current GFC is less than the trip threshold, the ground fault interrupt signal U_GFI remains at low level.

In the ground fault detection circuit 101, the first DC power supply 180 is a bridge rectifier circuit, with an output positive terminal thereof connected to V1 and an output negative terminal thereof connected to the logic ground GND of the circuit protection device.

The electromagnetic driving circuit 104 includes a trip coil 142 and a silicon controlled rectifier (SCR). An anode of the SCR outputs the fault state signal U_FS, which is connected to the trip coil 142 and the monitoring chip and auxiliary circuit 260, respectively. A cathode of the SCR is connected to the logic ground GND. The ground fault interrupt signal U_GFI is connected to a control electrode of the SCR through a resistor 149, and the emergency interrupt signal U_EI is connected to the control electrode of the SCR through a diode 148. When the ground fault interrupt signal U_GFI and/or emergency interrupt signal U_EI are high levels, the SCR is conducted, causing the fault state signal U_FS to be a low level. When a ground fault occurs, the SCR of the electromagnetic driving circuit 104 is in a conductive state, causing the tripping action of the trip coil 142 and the magnetic switch 88, which cuts off the AC power provided to the load and socket terminals, and thus achieves ground fault protection.

In the monitoring chip and auxiliary circuit 260, a monitoring chip 263 regularly turns the self-fault monitoring signal U_TEST from a low level to a high level to initiate the self-fault monitoring process, and receives the fault state signal U_FS from the electromagnetic driving circuit 104. When the fault state signal U_FS changes from a high level to a low level, the self-fault monitoring signal U_TEST is immediately turned from a high level to a low level to terminate the self-fault monitoring process. On the other hand, the self-fault monitoring signal U_TEST is also connected to the alarming circuit 203. During the self-fault monitoring process, when the SCR is normal, regardless of whether the ground fault protection unit 1 has a fault, the level of the fault state signal U_FS is inverted once, and the indicator light of the alarming circuit 203 is turned on indiscriminately and transiently.

In the emergency protection circuit 280, a resistor 281, a delay capacitor 282, and a reference voltage Ud are configured to set the maximum running time Tmax for the self-fault monitoring process. During the self-fault monitoring process, the self-fault monitoring signal U_TEST remains at high level, and the self-fault monitoring signal U_TEST charges the delay capacitor 282 through the resistor 281. When the ground fault protection unit 1 malfunctions, the running time Trun of the self-fault monitoring process is greater than the maximum running time Tmax, a voltage of the delay capacitor 282 is greater than the reference voltage Ud, and the emergency interrupt signal U_EI changes from a low level to a high level. When the circuit protection device is normal, the running time Trun is less than the maximum running time Tmax, and the voltage of the delay capacitor 282 is less than the reference voltage Ud, and the emergency interrupt signal U_EI remains at low level.

In the reset circuit 210, the self-fault monitoring signal U_TEST is connected to one electrode of the reset capacitor 216 through a resistor 215, and the other electrode of the reset capacitor 216 is connected to both a base of the transistor 217 and one electrode of a resistor 218. The other electrode of the resistor 218 is connected to the logic ground GND. An emitter of the transistor 217 is connected to the logic ground GND, and a collector of the transistor 217 outputs the reset signal U_clr. The reset circuit 210 obtains the transient information of the self-fault monitoring signal U_TEST through the charging and discharging characteristics of the reset capacitor 216 and the isolation characteristics of the reset capacitor 216 to the DC power. The process is as follows: when the self-fault monitoring signal U_TEST changes from a low level to a high level, a potential difference between the two ends of the reset capacitor 216 does not suddenly change; the self-fault monitoring signal U_TEST inputs a current into the base of the transistor 217 through the resistor 215 to turn on the transistor 217; the reset signal U_clr connected to the collector of the transistor 217 changes from a high level to a low level; subsequently, the potential difference between the two ends of the reset capacitor 216 gradually increases, and the current flowing through the reset capacitor 216 gradually decreases until the transistor 217 is turned off; after that, the level of the reset signal U_clr is maintained by the fault state triggering circuit 290; when the self-fault monitoring signal U_TEST changes from a high level to a low level, the reset capacitor 216 gradually discharges through the resistor 215 and the resistor 218 until the potential difference between the two ends of the reset capacitor 216 is zero. During this process, the base of the transistor 217 remains at low level, the transistor 217 remains in the off state, and the state of the reset signal U_clr remains unchanged. The reset circuit 210 outputs the reset signal U_clr only when the self-fault monitoring signal U_TEST changes from a low level to a high level, such that transient information in a level jump process of the self-fault monitoring signal U_TEST can be obtained.

In the fault state triggering circuit 290, the voltage comparator 294 and a positive feedback resistor 293 form a positive feedback circuit. The voltage comparator 294 outputs the fault state signal U_err. A negative input terminal of the voltage comparator 294 is connected to a reference voltage Ub, the reset signal U_clr is connected to a positive input terminal of the voltage comparator 294, and the emergency interrupt signal U_EI is connected to the positive input terminal of the voltage comparator 294 through a diode 291 and a resistor 292. One electrode of the resistor 293 is connected to the positive input terminal of the voltage comparator 294, and the other electrode of the resistor 293 is connected to an output terminal of the voltage comparator 294. The output terminal of the voltage comparator 294 is also connected to the alarming circuit 203. As a result, the voltage comparator 294 and its peripheral components achieve a bi-stable (high and low level) output function, with the process being: initially, the emergency interrupt signal U_EI is a low level and the reset signal U_clr is a high level; when the reset signal U_clr changes from a high level to a low level, a voltage Ua at the positive input terminal of the voltage comparator 294 is less than a voltage Ub at the negative input terminal of the voltage comparator 294 (for example, Ua is about 0.3V and Ub is about 3V), and the fault state signal U_err is a low level (e.g. 0.3V). Due to the positive feedback effect of the resistor 293, when the transistor 217 in the reset circuit 210 is turned off, the voltage Ua at the positive input terminal of the voltage comparator 294 remains less than the voltage Ub at the negative input terminal (Ua is about 0.3V and Ub is about 3V), and the fault state signal U_err remains at low level; when the emergency interrupt signal U_EI is a high level (e.g. 11V) and the transistor 217 is turned off, the voltage Ua at the positive input terminal of the voltage comparator 294 is greater than the voltage Ub at the negative input terminal (for example, Ua is set to be 6.5V and Ua>Ub), and the fault state signal U_err changes from a low level to a high level (e.g. 11V); at this time, the voltage Ua is approximately equal to the fault state signal U_err; afterwards, due to the positive feedback effect of the resistor 293 and the unidirectional conduction characteristic of the diode 291, when the emergency interrupt signal U-EI changes from a high level to a low level, the voltage Ua remains unchanged (approximately equal to U_err) such that the condition that Ua>Ub can be maintained, and the fault state signal U_err output by the voltage comparator 294 remains at high level.

Figure 3:
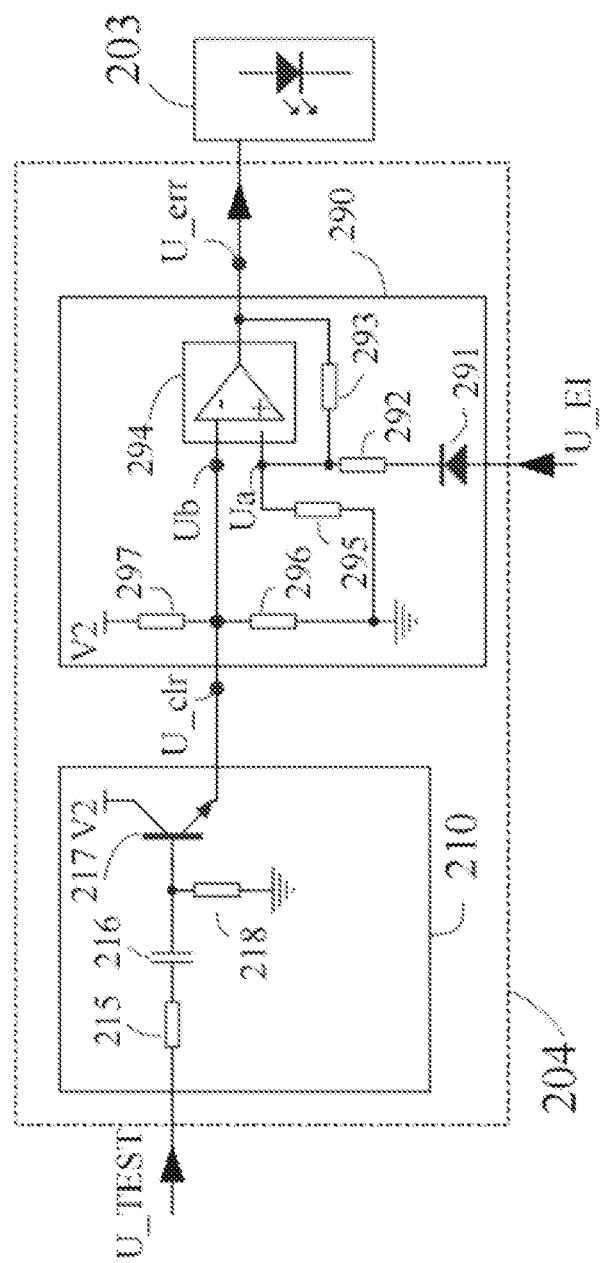
FIG. 3 is a circuit schematic diagram of the circuit protection device in accordance with another embodiment of the present disclosure.

In another embodiment of the fault state holding circuit 204 as shown in FIG. 3, the fault state holding circuit 204 has the same signal transmission function as the fault state holding circuit 204 in FIG. 2, which achieves the fault state holding function described in FIG. 1.

In the reset circuit 210, one electrode of a resistor 215 is connected to the self-fault monitoring signal U_TEST, and the other electrode of the resistor 215 is connected to one electrode of the reset capacitor 216. The other electrode of the reset capacitor 216 is connected to both one electrode of the resistor 218 and the base of the transistor 217. The other electrode of the resistor 218 is connected to the logic ground GND. The collector of the transistor 217 is connected to the second DC power supply 270 (V2). The emitter of the transistor 217 outputs the reset signal U_clr. The working principle of the reset circuit 210 is as follows: when the self-fault monitoring signal U_TEST is a low level, the resistor 215, the reset capacitor 216, and the resistor 218 form a discharging circuit, such that the potential difference between the two ends of the reset capacitor 216 is zero, a voltage at the base of the transistor 217 is 0 V, the transistor 217 is turned off, and a voltage of the reset signal U_clr is Ub_L (e.g. 3V); when the self-fault monitoring signal U_TEST changes from a low level to a high level, initially, the self-fault monitoring signal U_TEST inputs a current into the base of the transistor 217 through the resistor 215 and the reset capacitor 216, turning on the transistor 217 instantaneously; the reset signal U_clr output by the transistor 217 rises instantaneously to Ub_H (e.g. 10V); after that, during a period when the self-fault monitoring signal U_TEST remains at high level; as the potential difference between the two ends of the reset capacitor 216 gradually increases through charging, the voltage at the base of the transistor 217 gradually decreases to 0 V, the transistor 217 is turned off, and the voltage of the reset signal U_clr gradually returns to Ub_L; when the self-fault monitoring signal U_TEST changes from a high level to a low level, the reset capacitor 216 is discharged, and the transistor 217 remains in the off state, and the state of the reset signal U_clr remains unchanged. Therefore, the self-fault monitoring signal U_TEST switches between a high level and a low level, and the reset signal U_clr output by the reset circuit 210 only produces a transient level reversal (from Ub_L to Ub_H and then back to Ub_L) at the moment that the self-fault monitoring signal U_TEST changes from a low level to a high level, capturing transient information on a rising edge of the self-fault monitoring signal U_TEST.

In the fault state holding circuit 290, the voltage comparator 294 and the positive feedback resistor 293 form a positive feedback circuit, and the voltage comparator 294 outputs the fault state signal U_err. An anode of the diode 291 is connected to the emergency interrupt signal U_EI, a cathode of the diode 291 is connected to one electrode of the resistor 292, and the other electrode of the resistor 292 is connected to the resistor 295, the positive feedback resistor 293, and the positive input terminal of the voltage comparator 294 at the same time. The other electrode of the resistor 295 is connected to the logic ground GND, the other electrode of the positive feedback resistor 293 is connected to the fault state signal U_err output by the voltage comparator 294, and the negative input terminal of the voltage comparator 294 is connected to a voltage divider circuit formed by the second DC power supply V2, a resistor 297, and a resistor 296. The negative input terminal of the voltage comparator 294 is also connected to the reset signal U_clr.

The working principle of the fault state triggering circuit 290 is as follows: initially, a level of the reset signal U_clr (that is, Ub) is Ub_L (e.g. 3V), the emergency interrupt signal U_EI is a low level (about 0.3V), and the fault state signal U_err is a low level (about 0.3V); at this time, the voltage Ua at the positive input terminal of the voltage comparator 294 is Ua_1 (less than 0.3V), the voltage Ub at the negative input terminal of the voltage comparator 294 is Ub_L, Ua_1<Ub_L, and the fault state signal U_err remains at low level; when the reset signal U_clr changes from a low level Ub_L to a high level Ub_H (e.g. 10V) and then changes from a high level Ub_H to a low level Ub_L, Ub is kept greater than Ua, and the fault state signal U_err remains at low level; when the emergency interrupt signal U_EI changes from a low level to a high level (e.g. 11V), the voltage Ua at the positive input terminal of the voltage comparator 294 rises from Ua_1 to Ua_2 (for example, Ua_2 can be set to be 4.5V, determined by the resistor 292, the resistor 295, and the positive feedback resistor 293), the voltage Ub at the negative input terminal is Ub_L, Ua>Ub, and the fault state signal U_err turns from a low level to a high level (e.g. 11V); at this time, the voltage Ua rises from Ua_2 to Ua_3 under the action of the positive feedback resistor 293 (for example, Ua_3 can be set to be 6.5V, determined by the resistor 292, the positive feedback resistor 293, and the resistor 295); after that, if the emergency interrupt signal U_EI changes from a high level to a low level, due to the unidirectional conduction effect of the diode 291, the voltage Ua at the positive input terminal of the voltage comparator 294 drops back to Ua_4 (for example, Ua_4 can be set to be 3.3V, determined by the resistor 295 and the positive feedback resistor 293), which is still greater than Ub_L, thus, the fault state signal U_err remains at high level, thereby achieving the function of maintaining the fault state signal; if the fault state signal U_err is a high level, when the reset signal U_clr rises from a low level Ub_L to a high level Ub_H, the voltage Ub at the negative input terminal of the voltage comparator 294 rises from a low level Ub_L to a high level Ub_H, and Ub_H>Ua_3, that is, the voltage Ub at the negative input terminal of the voltage comparator 294 is greater than the voltage Ua at the positive input terminal of the voltage comparator 294, and the fault state signal U_err instantaneously returns to a low level.

In the above two embodiments shown in FIGS. 2 and 3, in each self-fault monitoring process, the alarming circuit 203 receives the fault state signal U_err. When the ground fault protection circuit 1 malfunctions, the fault state signal U_err changes from a high level to a low level, and finally returns to a high level, causing the indicator light of the alarming circuit 203 to flash once, which overcomes the defects that a short and indistinct flashing of the indicator light is formed only by the self-fault monitoring signal U_TEST output by the monitoring chip and the auxiliary circuit 260, and thus improves the alarming effect. In this embodiment, the reset circuit 210 and the fault state triggering circuit 290 are simple, economical, and practical, and can effectively achieve the function of maintaining the fault state.

It is understandable that the above-mentioned technical features may be used in any combination without limitation. The above descriptions are only the embodiments of the present disclosure, which do not limit the scope of the present disclosure. Any equivalent structure or equivalent process transformation made by using the content of the description and drawings of the present disclosure, or directly or indirectly applied to other related technologies in the same way, all fields are included in the scope of patent protection of the present disclosure.

The invention claimed is:

1. A circuit protection device for automatically monitoring operation faults, comprising a ground fault protection unit and a self-fault monitoring unit, the ground fault protection unit comprising a ground fault detection circuit, an AC power channel, and an electromagnetic driving circuit, the self-fault monitoring unit comprising an automatic test circuit, a measurement and control circuit, and an alarming circuit; wherein the measurement and control circuit is configured to periodically output a self-fault monitoring signal U_TEST to initiate a self-fault monitoring process, to control the automatic test circuit to output a ground fault current GFC to the ground fault protection unit, and to monitor a fault state signal U_FS output by the electromagnetic driving circuit in the ground fault protection unit to determine an operating condition of the ground fault protection unit; wherein the measurement and control circuit is further configured to output an emergency interrupt signal U_EI to the electromagnetic driving circuit to trigger an operation of the electromagnetic driving circuit when the ground fault protection unit malfunctions, thereby achieving an emergency protection function; and wherein the self-fault monitoring unit further comprises: a fault state holding circuit comprising a reset circuit and a fault state triggering circuit, wherein the reset circuit receives the self-fault monitoring signal U_TEST output by the measurement and control circuit periodically and outputs a reset signal U_clr, the fault state triggering circuit receives the reset signal U_clr and the emergency interrupt signal U_EI output by the measurement and control circuit, and when the ground fault protection unit malfunctions, the fault state triggering circuit outputs and holds a fault state signal U_err, causing the alarming circuit to remain in an alarming state which indicates a fault of the circuit protection device.

2. The circuit protection device according to claim 1, wherein the reset circuit comprises a reset capacitor that captures level inversion information of the self-fault monitoring signal U_TEST for generating the reset signal U_clr.

3. The circuit protection device according to claim 1, wherein the fault state triggering circuit comprises a voltage comparator that receives the reset signal U_clr and the emergency interrupt signal U_EI and outputs the fault state signal U_err.

4. The circuit protection device according to claim 3, wherein the fault state signal U_err output by the fault state triggering circuit comprises a low-level state and a high-level state; the alarming circuit receives the fault state signal U_err; during the self-fault monitoring process, when the circuit protection device is normal, the alarming circuit stops outputting alarming information; when the ground fault protection unit malfunctions, the alarming circuit remains in the alarming state.

5. The circuit protection device according to claim 1, wherein the AC power channel comprises a magnetic switch, AC power input terminals, and load terminals; and wherein the magnetic switch is configured to connect or cut off an electrical path between the AC power input terminals and the load terminals.

6. The circuit protection device according to claim 1, wherein the AC power channel comprises a ground fault current sensor and a neutral line repeated grounding sensor to sense the ground fault current GFC.

7. The circuit protection device according to claim 6, wherein the ground fault detection circuit comprises a ground fault detection chip, and a first DC power supply; wherein the ground fault detection chip is configured to detect a ground fault signal transmitted by the ground fault current sensor and the neutral line repeated grounding sensor, and to output a ground fault interrupt signal U_GFI; wherein the first DC power supply is configured to provide a DC power to the ground fault detection chip; and wherein a negative electrode of the first DC power supply is used as a logic ground of the circuit protection device.

8. The circuit protection device according to claim 1, wherein the self-fault monitoring signal U_TEST is connected to the alarming circuit, such that the alarming circuit outputs alarming information.

9. The circuit protection device according to claim 8, wherein the alarming circuit is an indicator light or a voice alarm.

10. The circuit protection device according to claim 1, wherein the measurement and control circuit is configured to output the self-fault monitoring signal U_TEST once every minute.

* * * * *